Figure 1A:
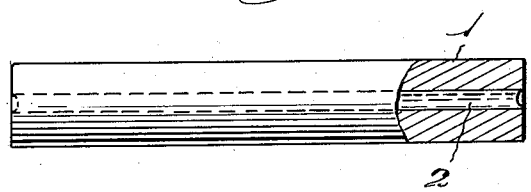

Sept. 10, 1963  C. H. EHRHARDT ET AL  3,103,277
SAMPLE HANDLING CAPSULE
Filed July 13, 1959

INVENTORS.
Charles E. Ehrhardt
Warren H. Moeller
Henry M. Grubb
By Gerald Rose attorney

United States Patent Office 3,103,277
Patented Sept. 10, 1963

3,103,277
SAMPLE HANDLING CAPSULE
Charles H. Ehrhardt, Western Springs, Ill., and Warren H. Moeller, Chesterton, and Henry M. Grubb, Highland, Ind., assignors to Standard Oil Company, Chicago, Ill., a corporation of Indiana
Filed July 13, 1959, Ser. No. 826,757
3 Claims. (Cl. 206—46)

This invention relates to an improved method and means for introducing samples into analytical equipment. More particularly, it provides a system for introducing such samples having accurately predetermined volumes and in a manner which entirely avoids contamination from air and other materials.

In various analytical devices, particularly in mass spectrometers, a liquid or gaseous sample under analysis must be introduced into the device in a manner which permits the virtually complete elimination of contaminating materials. Air is the most troublesome of these. Also, the sample must be of known volume, or at least of reproducibly constant volume. These two requirements have heretofore imposed substantial limitations on the accuracy of mass spectrometry, particularly when the sample undergoing analysis has a low volatility, and must be introduced in vapor form at elevated temperatures.

Various attempts of the prior art to solve the problem of introducing samples of known volume and free from air or other contaminants have met with little success and only limited approval. Various means such as hypodermic syringes and self-sealing diaphragms are useless at high temperatures, to say nothing of their lack of precise volume control. Other sample introduction systems, featuring liquid metal diplegs or more advanced types of sintered glass-liquid metal combinations have been most successful to date, but molten metals are frequently corrosive and chemically reactive at elevated temperatures, and even the best systems limit the accuracy of mass spectrometry equipment to about ±5 to 10% in the determination of spectral peak sensitivities (Archie Hood, Analytical Chemistry, 30, No. 7, page 1218, July 1958).

Accordingly, a primary object of the present invention is to provide a sample introduction system for analytical devices such as mass spectrometers which permits extremely high accuracy of the analytical equipment by effecting sample introduction without contamination by air or other agents, and which introduces a fluid sample of accurately predetermined volume.

Briefly, and in accordance with the invention, we enclose the sample for analysis in a sealed capsule made of a metal which fuses or melts at a temperature below that at which the sample itself exhibits any substantial decomposition. This sealed capsule is introduced into an air lock from which air may be removed by such means as evacuation, and the intact capsule is then transferred to a second chamber or melting zone where the metal which encapsulates the sample is melted away, thereby releasing the sample into the second chamber and into the analytical device.

Exceptional precision in preparing a sample of known weight or volume can be accomplished in accordance with our invention. If the metal tube used in making the capsule has a bore of known internal diameter, and if the tube has or is cut to a predetermined length, then the sample volume is accordingly very accurately predetermined. A reproducibility of ±0.5% in volume measurements, and ±2% in overall analytical results, is readily attained. Moreover, sample volumes on the order of one microliter or less can be handled with this same accuracy, a degree of performance never before attainable insofar as we are aware.

The present encapsulation technique affords numerous other advantages. Primarily, contamination by air or other gases can be almost entirely eliminated. Also, even the most volatile liquid samples can be stored for long periods of time, and can readily be shipped for analysis when necessary for referee samples or for cooperative research programs. For use with high molecular weight, i.e. high boiling samples, the present technique has no peer; no liquid sealed valves and no fritted glass discs are employed, thus minimizing opportunities for sample decomposition on catalytically active surfaces. Also, in contrast to molten metal diplegs, there is no problem of sample holdup. Lastly, the test sample is not exposed to any high temperatures whatsoever before actual melting of the encapsulating tube. Other advantages will become apparent as the description of the invention proceeds in detail hereafter.

The invention will be more fully understood by reference to the ensuing specification in conjunction with the attached drawing wherein FIGURE 1 shows a capillary tube made of a low-melting metal such as indium and which has its bore filled with a liquid test sample, in various stages of (a) filling, (b) cold welding to size, and (c) the finished capsule in cross-section.

Figure 1B:
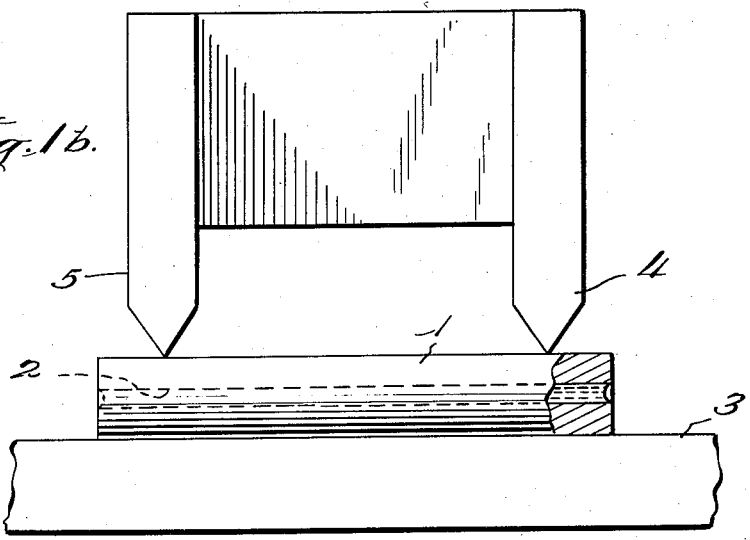

Turning first to FIGURE 1, FIGURE 1(a) shows a length of capillary tubing 1 made of low-melting metal which has been filled with the liquid sample 2 by capillary action.

The length, outer diameter and bore diameter of tube 1 may be of any desired size to provide a fluid sample of suitable volume and sufficient accuracy for analysis. Somewhat more convenience is realized with tubes of less than say one-half inch long, although precision and accuracy of the volume obtained is achieved with somewhat longer tubes. A suitable tube size may be a one inch length of tubing which has inside diameter of 0.010 and an outside diameter of about 0.040″. Since the requirement of a constant volume sample imposes a similar requirement of constant internal diameter, it is desirable that this dimension be held at as accurate a tolerance as possible. Accordingly, drawn tubing of circular cross-section is to be preferred. The internal diameter may be of any selected dimension, but if the tube is to be filled completely with the test sample by capillary action, then it is desirable to have the inner diameter of suitable size to fill the tube by capillarity in a reasonable length of time e.g. 0.050″ I.D. or less.

Metal used in making tube 1 are available in a wide range of compositions and have varied melting points. It is primarily necessary however that the metal should have a melting point below that at which the sample begins to decompose to an extent which will interfere with subsequent analysis. Either pure elements or alloys of various metals may be employed. A desirable metal should be relatively soft so that it can be sealed by pinching or the like; it should be malleable so that it can be easily drawn into tubing; and preferably it should have a low vapor pressure so as not to contaminate analytical equipment. Also, it should not oxidize too readily in air at room temperature, so that it can form a metal-to-metal bond by the process of "cold welding" when pressure is applied to adjoining surfaces. Cold welding is a common property of all metals, provided there be no major surface contaminants and that the applied pressure be sufficiently great to cause metal-to-metal contact. Cold welding, which is also termed self welding or contact welding, is realized easily at temperatures within about 200° C. of the metal's melting point.

Another requirement of the metal is that it not be reactive with the sample fluid at its melting temperature. This consideration somewhat limits the range of usable metals with certain samples, e.g. halogenated organic compounds, but numerous metals are available which are sufficiently inert at their melting points.

It has been found that the metal indium possesses outstanding characteristics of softness, ductility, low melting point (155° C.), and resistance to most chemicals. Accordingly, commercially pure indium metal and the indium-containing alloys, such as indium-tin eutectic, constitute the preferred fusible metals for use in accordance with the present invention. Indium may easily be die formed into long tubes of hundreds of feet in length, if necessary. Indium however reacts with certain organic compounds which release halogens at temperatures above about 150° C., and accordingly more chemically resistant materials may be preferred in this service. Tin is of value where the sample is normally a solid, and melts at a temperature above the melting point of indium.

An extensive listing of the chemical and physical properties of individual elemental metals and their various alloys is compiled in the book, "Liquid Metals Handbook," by Richard N. Lyon, published by the Atomic Energy Commission and the Department of the Navy, second edition (revised), January 1954, especially chapters 2 and 3.

Among the elemental metals which have melting points below an arbitrarily selected 250° C., there may be mentioned: the alkali metals, especially lithium (M.P. 179° C.) indium, gallium (30° C.), mercury (−39° C.), tin (232° C.), etc. The above book lists the composition and melting points of numerous low melting alloys, primarily made up of various proportions of bismuth, lead, tin, cadmium, mercury, and antimony, with more or less minor amounts of such metals as thallium, copper, zinc, etc. Illustrative alloys include one of 16 weight percent tin, 21.5% indium, and 62.5% gallium, which melts at 10.7° C., ranging through Woods metal (M.P. 65.5° C.), Lipowitz' alloy (M.P. 70° C.), Rose's metal (M.P. 100° C.), etc.

As mentioned previously, indium tubing is ideal for the present process. Not only does it have the requisite chemical and physical properties for most analytical work, but its vapor pressure is exceedingly low, which is of importance when conducting mass spectrometric analyses at elevated temperatures, e.g. above about 200° C.

Figure 1C:
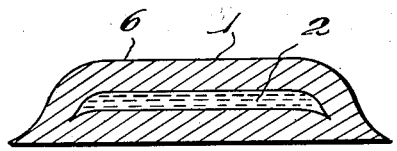

Turning once again to FIGURE 1, tube 1 may be filled with liquid sample 2 by any suitable procedure. It is preferred to employ an open ended tube and fill the same by capillary action, thereafter place the tube on an anvil or cutting block 3 and pinch remote partions thereof together by means of a pair of dies 4 and 5, which are spaced at a known distance apart and which are caused to move toward anvil 3 thereby pinching and sealing off a length of tube 1. In FIGURE 1(c), a capsule is shown in section which consists of pinched tube 1, with its ends sealed by cold welding, and containing or confining a known quantity of sample 2.

Similarly, a relatively long tube may be filled by capillarity or other means, and then the ends thereof sealed. Then short portions of the sealed tube may be obtained by re-cutting using the apparatus shown in FIGURE 1(b) to provide a plurality of separated or separable capsules, each containing a fluid sample of constant volume and composition.

Gas samples may be obtained and encapsulated by sealing a hollow tube 1 in an atmosphere of the test gas. If the gas is refrigerated and liquefied, it may be convenient to employ gallium (M.P. +30° C.) or indium-tin eutectic as the encapsulating metal.

In obtaining liquid-filled capsules, tube 1 may be sealed either under the surface of the liquid or, especially if tube 1 has a sufficiently small bore, away from the bulk of the liquid sample.

It is also possible to obtain a gravimetric determination of sample quantity. Tube 1 is first weighed, and then filled with sample fluid. Its ends are then cold welded shut, and the tube then re-weighed.

The instant system has been described in connection with its use in mass spectrometry. It will be apparent that its numerous advantages are of like importance in other analytical systems wherein either accurate sample sizing and/or freedom from air or contamination are essential or desirable to the analysis. For example, in ultraviolet and in infrared analyses, it is desirable to eliminate contaminants of all types, and accordingly the inventive system is advantageously employed. Also in gas chromatography, where reproducibility of sample volumes and prompt introduction of a contiguous and compact "slug" or "burst" of the sample is desirable, the instant invention is of exceptional utility.

From the foregoing presentation, it is evident that there has been provided an especially valuable technique for use in conjunction with modern chemical and physical analysis procedures. By encapsulating a liquid or gaseous sample in a low-melting metal tube, the sample may be introduced into an analytical device via a gas lock chamber, and may be thus introduced without encountering any contamination from air and the like. Moreover, the sample is of constant and reproducible known amount, and errors arising from sporadic sample volumes may be eliminated entirely.

While the invention in its various aspects has been described with reference to particular embodiments thereof, it is apparent that these are by way of illustration only. Accordingly, it will be understood that modifications and variations thereof will be apparent to those skilled in the art, and it is thus intended to embrace all such modifications and embodiments as fall within the broad scope of the appended claims.

We claim:

1. A sample handling capsule adapted for introducing a sample of known amount into an analytical device, which comprises an elongated tube having a bore therethrough with an inner diameter of not more than 0.050 inch and containing a fluid sample in said bore, said tube having been cold welded at both ends thereof, said tube being made of a metal which melts at a temperature below that at which the sample decomposes.

2. The capsule of claim 1 wherein said metal melts at a temperature below about 250° C.

3. The capsule of claim 2 wherein said metal is indium.

References Cited in the file of this patent

UNITED STATES PATENTS

| | | |
|---|---|---|
| 636,317 | Von Buhler | Nov. 7, 1899 |
| 2,010,318 | Painter | Aug. 6, 1935 |
| 2,707,584 | Hoover | May 3, 1955 |
| 2,736,810 | Clark | Feb. 28, 1956 |
| 2,742,511 | Franzen | Apr. 17, 1956 |
| 2,751,072 | Ditmar | June 19, 1956 |
| 2,779,462 | Hoag | Jan. 29, 1957 |
| 2,824,967 | Kamen | Feb. 25, 1958 |